US008196929B2

(12) United States Patent
Brunelle

(10) Patent No.: US 8,196,929 B2
(45) Date of Patent: Jun. 12, 2012

(54) VIDEO CRIBBAGE GAME

(76) Inventor: Kenneth J. Brunelle, Las Vegas, NV (US)

( * ) Notice: Subject to any disclaimer, the term of this patent is extended or adjusted under 35 U.S.C. 154(b) by 0 days.

(21) Appl. No.: 13/154,908

(22) Filed: Jun. 7, 2011

(65) Prior Publication Data

US 2011/0237319 A1 Sep. 29, 2011

Related U.S. Application Data

(63) Continuation of application No. 12/487,819, filed on Jun. 19, 2009, which is a continuation of application No. 12/011,700, filed on Jan. 29, 2008, now abandoned.

(51) Int. Cl.
*A63F 1/00* (2006.01)
*A63F 13/00* (2006.01)

(52) U.S. Cl. ......................................... 273/292; 463/13

(58) Field of Classification Search .................. 273/292, 273/274, 309; 463/13, 12, 20
See application file for complete search history.

(56) References Cited

U.S. PATENT DOCUMENTS

| | | | | |
|---|---|---|---|---|
| 6,554,282 | B2 | 4/2003 | VanderKley et al. | |
| 6,824,137 | B2 | 11/2004 | Foster et al. | |
| 2009/0121433 | A1* | 5/2009 | Snow et al. | 273/292 |

* cited by examiner

*Primary Examiner* — Benjamin Layno

(57) ABSTRACT

The present invention provides a gaming machine game for providing an electronic game for play by a player using a plurality of cards. The game includes a wager placed by the player and a player hand including at least four cards. A player score is calculated for the player hand according to a set of cribbage rules. The player receives a payout based on the wager if the player score exceeds a predetermined total. The payout preferably increases as the player score increases based on the odds of achieving a given player score. The game may include an initial player hand, with the player replacing between none and all of the cards from the initial player hand to create the player hand. The game may be played using a video display or live.

18 Claims, 3 Drawing Sheets

VIDEO CRIBBAGE GAME

CROSS REFERENCE TO RELATED APPLICATION

This application claims the benefit of U.S. patent application Ser. No. 12/487,819, filed Jun. 19, 2009, which claims the benefit of U.S. patent application Ser. No. 12/011,700, filed Jan. 29, 2008, the disclosures of which are hereby incorporated by reference in its entirety.

FIELD OF THE INVENTION

This invention relates to games of chance, and more specifically to a game machine which provides an electronic card game wherein a player is awarded a payout for a hand scored using a set of cribbage rules if the score exceeds a predetermined total.

BACKGROUND OF THE INVENTION

Video poker games have become exceedingly popular. In a typical video poker game, a player is dealt a certain number of cards, and has a one-time option to replace between none and all of the cards. The player is awarded a payout based on various paytables for achieving a hand having a given poker rank. Given the popularity of video poker, numerous variations to this basic structure have arisen.

Cribbage is a card game having a historically successful public following, albeit in a non-casino environment. In a traditional game of cribbage, players play against one another, accumulating points based on a well-established cribbage scoring system. The object of the present invention is to provide a video-poker type game employing certain aspects of the game of cribbage in order to capitalize on the popularity of both games to increase revenue for casinos while providing immense player enjoyment.

SUMMARY OF THE INVENTION

The present invention provides a game for play by a player using a plurality of cards, with each of the cards having a rank and a suit associated therewith. The game includes a wager placed by the player and a final player hand including at least four cards. A player score is calculated for the final player hand according to a set of cribbage rules. The player receives a payout based on the wager if the player score exceeds a predetermined total. Preferably, the payout increases as the player score increases. For example, the payout may increase according to the odds of achieving a particular player score. The game may include an initial player hand of at least four cards, with the player replacing between none and all of the cards from the initial player hand to create the final player hand. The game may be played on a video display or on a tangible display without changing the inventive concept.

The player score is calculated using a set of cribbage rules. In one aspect of the invention, the set of cribbage rules includes a rule awarding points for each combination of cards from the player hand having ranks which sum to fifteen. In another aspect of the present invention, the set of cribbage rules includes a rule awarding points for each pair of cards from the player hand having the same rank. In yet another aspect of the present invention, the set of cribbage rules includes a rule awarding points for each card from the player hand in a rank sequence of three or more cards. In still another aspect of the present invention, the set of cribbage rules includes a rule awarding points for three cards from the player hand being of the same suit. The present invention may further award additional points for four cards of the player hand being of the same suit.

The present invention also provides a video cribbage game for play by a player using a plurality of symbols, preferably playing cards. The game includes a wager placed by the player and a player hand including four symbols. A player score is calculated for the player hand according to a set of cribbage rules. The game further includes a paytable including a plurality of scores. The player is awarded a payout based on the wager if the player score matches any of the plurality of scores included on the paytable. The paytable is preferably generated based on the odds of achieving each of the plurality of scores.

In a first aspect of the present invention, a gaming machine for providing a game to a player is provided. The gaming machine includes a user interface, a video display, and a controller. The user interface allows the player to place a wager. The controller is coupled to the user interface and the display for providing a virtual deck of playing cards and allowing the player to place a wager using the user interface. Each of the playing cards has a rank and a suit. The controller randomly establishes an initial player hand consisting of a predetermined number of the playing cards, displays the initial player hand on the video display, allows the player to discard zero or more of the playing cards in the initial player hand using the user interface, and replaces any discarded card in the initial player hand with a randomly chosen playing card from the deck of playing cards forming a final player hand. The controller also displays the final hand on the video display, establishes a player score as a function of the final player hand using a set of cribbage type counting rules, displays the player score on the video display, and responsively awards the player an award as a function of the player score and a predetermined pay table.

In a second aspect of the present invention, a gaming machine for providing a game to a player is provided. The gaming machine includes a user interface, a video display, and a controller. The user interface allows the player to place a wager. The controller is coupled to the user interface and the display for providing a virtual deck of playing cards and allowing the player to place a wager using the user interface. Each of the playing cards has a rank and a suit. The controller randomly establishes an initial player hand consisting of a predetermined number of the playing cards, displays the initial player hand on the video display, allows the player to discard zero or more of the playing cards in the initial player hand using the user interface, replaces any discarded card in the initial player hand with a randomly chosen playing card from the deck of playing cards, forms a final player hand, and displays the final player hand on the video display. The controller also establishes a player score as a function of the final player hand using a set of cribbage type counting rules, displays the player score on the video display, compares the player score with a predetermined total, and responsively awards the player an award as a function of the player score, the predetermined total, and a predetermined pay table if the player score exceeds the predetermined total.

BRIEF DESCRIPTION OF THE DRAWINGS

The above features and advantages and other features and advantages of the present invention are readily apparent from the following detailed description of the best modes for carrying out the invention when taken in connection with the accompanying drawing, wherein.

DESCRIPTION OF THE PREFERRED EMBODIMENTS

Figure 5:
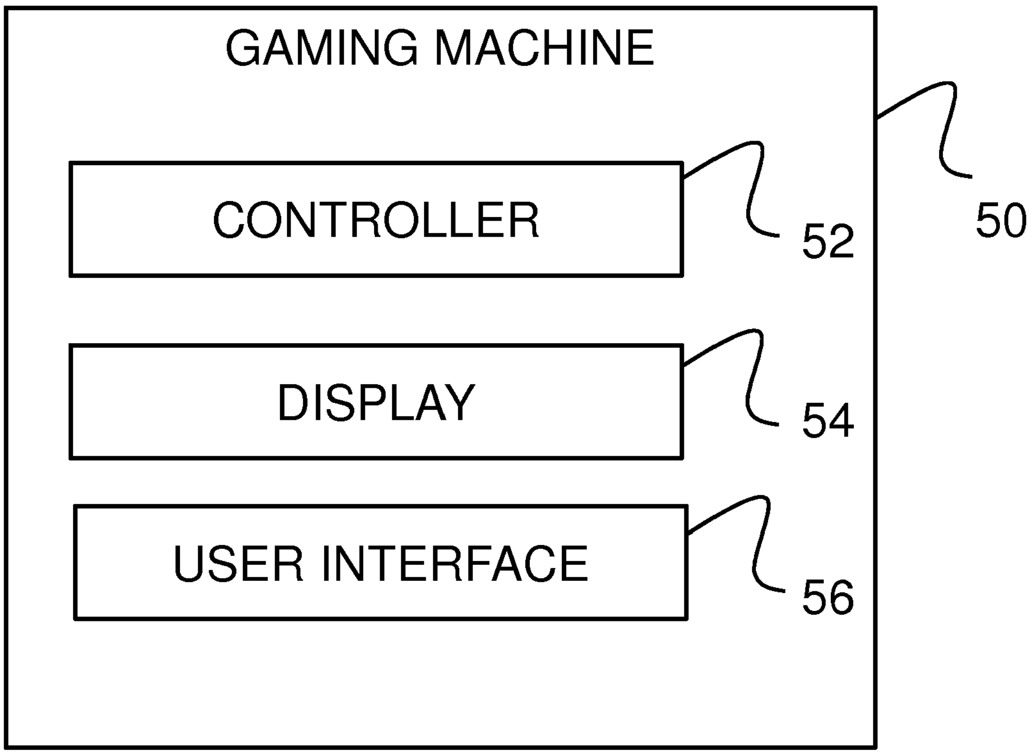

With reference to the Figures, and in operation, the present invention provides a gaming machine 50 and a method for providing a video cribbage game which may award a player an award based on the poker hand and poker pay table. With specific reference to FIG. 5, the gaming machine 50 includes a controller 52, a user interface 54, and a display 10, 56. The gaming machine 50 may take one of several forms. For example, the gaming machine 50 may be an upright or slant-top machine or a kiosk machine which may be located within a casino. The gaming machine 50 may be stand-alone machine or may be linked to an external or remote computer over a network (not shown). The functions of the controller 52 (see below) may be divided between the controller 52 located on the gaming machine 50 and the external or remote computer. This allows the game to be played at numerous gaming machines 50 by one or more players. The user interface 54 may include one or more buttons (physical or implemented via a touchscreen), card reader, and bill reader/validator. Such gaming machines 50 are known in the prior art and are therefore not further discussed. Alternatively, the gaming machine 50 may be a desktop computer, laptop or notebook computer, cell phone or other computing or mobile device which allows the player to place wagers and play the game. Such gaming machines 50 may be connected to a server computer or remote computer (not shown) to facilitate the play of the game and the wagering aspect of the present invention.

The user interface 54 allows a player to make wager(s), keep and discard cards during game play, and take other actions necessary for the play of the game. For example, the user interface 54, could include a series of physical buttons and/or buttons implemented via a touchscreen (not shown) for selectively, keeping/holding or discarding specific cards and/or could allow the player to use the touchscreen to selectively keep/hold or discard specific cards by touching the cards as displayed. The status of cards, i.e., to be held or discarded, could be illustrated in any manner, such use of color, highlighting, borders . . . . The user interface 54 will depend on the type of gaming machine 50, and may include without limitation, buttons, touchscreens, a keyboard and/or a keypad.

Figure 1:
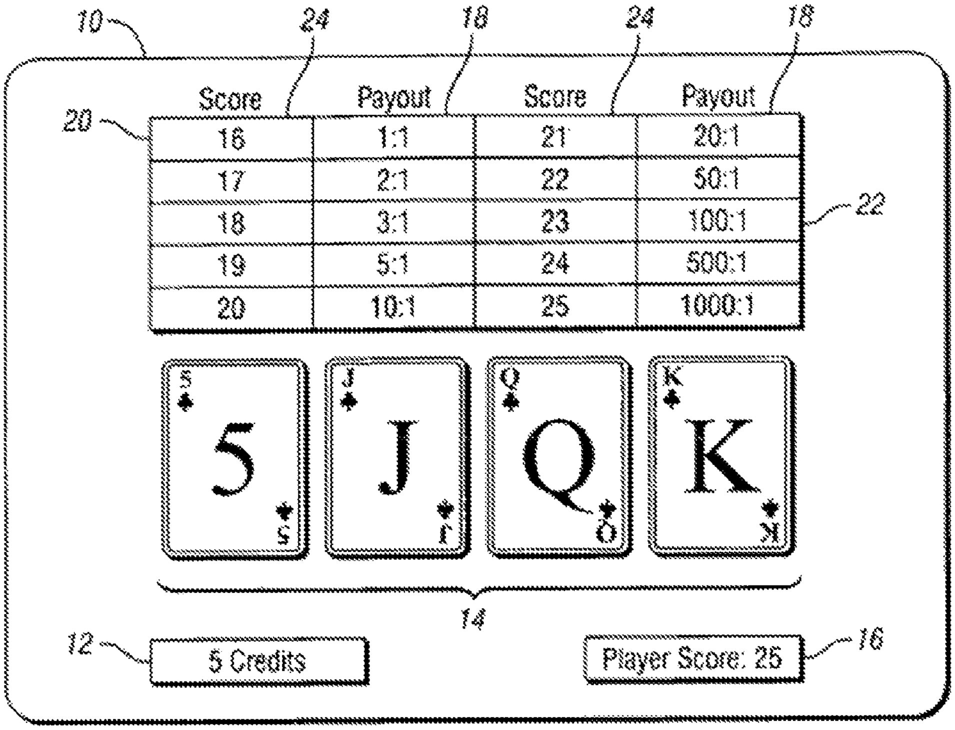
FIG. 1 is a schematic of a video display incorporating a game according to a preferred embodiment of the present invention.

Referring to the drawings, FIG. 1 presents a schematic of a video display 10, 54 incorporating the preferred embodiment of a game according to the present invention. While the game is described herein for play using a video display 10, 54, i.e., "video cribbage," it should be appreciated that the game could be played live using a tangible display including physical playing cards and a gaming table without changing the inventive concept. A wager, shown in FIG. 1 to be "5 credits," is placed by a player (not shown) using a player input button 12 of the user interface 56. A player hand 14 is then provided to the player; as shown in FIG. 1, the player hand 14 includes four cards: 5 clubs, J clubs, Q clubs, and K clubs. However, it should be appreciated that the player hand 14 could include more than four cards within the scope of the present invention. The cards making up the player hand preferably come from a standard deck of fifty-two cards, with each card having a rank and a suit associated therewith as known in the art. However, any group of symbols having a rank and a suit may be used to play the game described herein.

According to the present invention, a player score 16 is calculated by the controller 52 for the player hand 14 according to a set of cribbage rules. In the preferred embodiment, the set of cribbage rules includes at least the following rules: Rule 1) two points are awarded for each combination of cards having ranks which sum to fifteen (i.e., 9 clubs+6 spades, or K hearts+2 hearts+3 diamonds); Rule 2) two points are awarded for each pair of cards having the same rank (i.e., Q hearts+Q diamonds, or 2 spades+2 clubs); Rule 3) one point is awarded for each card in a rank sequence of three or more cards (i.e., 2 spades+3 spades+4 hearts=3 points, 1 point for each card in the rank sequence); Rule 4) three points are awarded for three cards of the same suit (i.e., 2 clubs+5 clubs+J clubs); and Rule 5) four points are awarded for four cards of the same suit (i.e., 2 hearts, 3 hearts, J hearts, K hearts).

It should be noted that four sequentially-ranked cards, such as 10 clubs, J clubs, Q clubs, K clubs, will be scored as follows under Rule 3:

| | |
|---|---|
| 10 clubs + J clubs + Q clubs + K clubs | 4 points |
| 10 clubs + J clubs + Q clubs | 3 points |
| J clubs + Q clubs + K clubs | 3 points |
| Total (under Rule 3): | 10 points |

That is, a player not only receives 4 points for having four sequentially-ranked cards, but also 3 points for each of the two sets of three sequentially-ranked cards. Similarly, four cards of the same suit, such as 2 hearts, 4 hearts, 8 hearts, Q hearts, will be scored as follows under Rules 4 and 5:

| | |
|---|---|
| 2 hearts, 4 hearts, 8 hearts | 3 points (Rule 4) |
| 2 hearts, 4 hearts, Q hearts | 3 points (Rule 4) |
| 2 hearts, 8 hearts, Q hearts | 3 points (Rule 4) |
| 4 hearts, 8 hearts, Q hearts | 3 points (Rule 4) |
| 2 hearts, 4 hearts, 8 hearts, Q hearts | 4 points (Rule 5) |
| Total (under Rules 4 and 5): | 16 points |

That is, a player not only receives 4 points for four cards of the same suit under Rule 5, but also 3 points for each of the four sets of three cards of the same suit under Rule 4.

The set of cribbage rules may assign different point values for the card combinations listed herein without changing the inventive concept. Additionally, the set of cribbage rules may include additional rules. By way of example, in a traditional cribbage game, a player may receive 1 point for "Nobs," which is a J of the same suit as a community card used in the traditional game. While there is no community card used in the present invention, the set of cribbage rules could include a rule awarding a point for "Nobs" in some other manner, such as permanently assigning the J clubs as "Nobs" and awarding 1 point if the player hand 14 includes the J clubs.

Returning now to FIG. 1, evaluating the player hand 14 depicted according to the set of cribbage rules defined for the preferred embodiment yields a player score 16 of "25" as follows:

| | |
|---|---|
| 5 clubs + J clubs | 2 points (Rule 1) |
| 5 clubs + Q clubs | 2 points (Rule 1) |
| 5 clubs + K clubs | 2 points (Rule 1) |
| J clubs + Q clubs + K clubs | 3 points (Rule 3) |
| 5 clubs + J clubs + Q clubs | 3 points (Rule 4) |
| 5 clubs + J clubs + K clubs | 3 points (Rule 4) |
| 5 clubs + Q clubs + K clubs | 3 points (Rule 4) |
| J clubs + Q clubs + K clubs | 3 points (Rule 4) |
| 5 clubs + J clubs + Q clubs + K clubs | 4 points (Rule 5) |
| Total: | 25 points |

It again merits note that the rules for the preferred embodiment may be altered without altering the inventive concept. For example, the set of cribbage rules may include only Rules 1 through 4, such that the point total of the player hand 14 shown in FIG. 1 would be only 21 points. It matters only that the player receive a player hand 14 from which a player score 16 is calculated using a set of cribbage rules to practice the present invention.

The player receives a payout 18 on the wager if the player score 16 exceeds a predetermined total 20. The predetermined total 20 is selected to assure that a "house," i.e., a casino or other game operator, receives an adequate return on the game to justify its implementation, while also ensuring the player receives a payout enough of the time to continue game play. The predetermined total 20, then, will be based on the number of cards included in the player hand 14, and the set of cribbage rules used to evaluate the player hand 14. The payout 18 will increase as the player score 16 increases. Specifically, the payout 18 will increase according to the odds of achieving a given player score 16, and is thus also based on the number of cards and the set of cribbage rules used.

In the preferred embodiment of the present invention, a paytable 22 including a plurality of scores 24 may be generated based on the odds of achieving each of the plurality of scores 24. The paytable 22 may be displayed at the top of the video display 10, 54, much like a traditional video poker game. Following calculation of the player score 16 from the player hand 14, the player is awarded a payout 18 based on the wager if the player score 16 matches any of the plurality of scores 20 included on the paytable 22.

It should be noted that the payouts 18, the predetermined total 20, the paytable 22 and the plurality of scores 24 shown in FIG. 1 are included only for reference; the actual values for these elements of the present invention must be determined based on the number of cards and set of cribbage rules used to play the game, as will be recognized by one skilled in the art. For example, the predetermined total 20, "16" as shown, and the highest of the plurality of scores 24, "25," as well as the odds upon which the payouts 18 are based, may change drastically within the scope of the present invention. Additionally, the values included, herein likely do not correspond exactly with the values that will be necessitated by using a four-card player hand and Rules 1 through 5 above, as in the preferred embodiment. The values selected are only meant by way of example to explain the game according to the present invention.

Figure 2A:
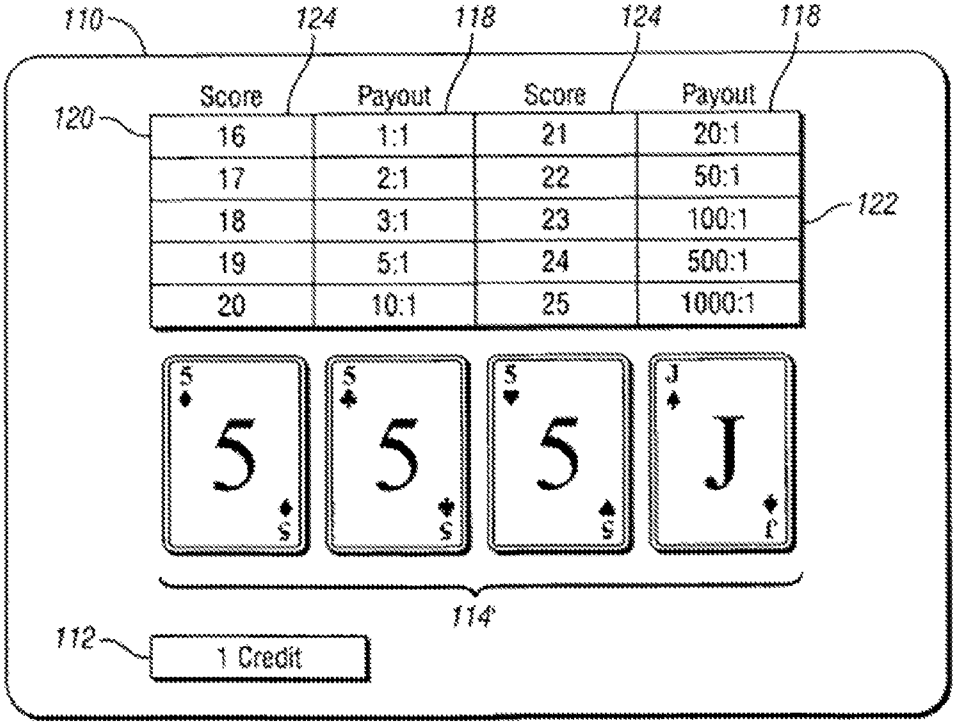
FIG. 2*a* is a schematic of another aspect of the game according to the present invention.
Figure 2B:
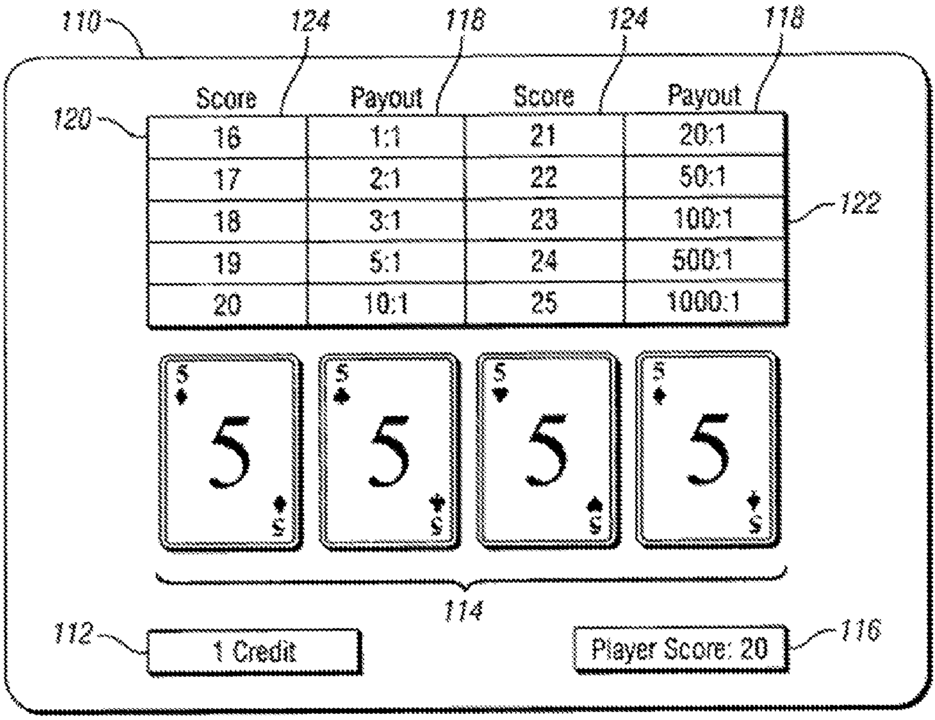
FIG. 2*b* is a schematic of the embodiment shown in FIG. 2*a* following replacement of cards from an initial player hand.

Turning now to FIGS. 2*a* and 2*b*, another aspect of the present invention is shown on a video display 110. Following placement of a wager using player input button 112, herein "1 credit," a player is dealt an initial player hand 114'. The player is then provided the option of replacing between none and all of the cards in the initial player hand 114' to create a player hand 114 (shown in FIG. 2*b*). As such, the player hand 114 may be referred to as a final player hand 114 when a discard option is provided. By way of example, the initial player hand 114' shown in FIG. 2*a* includes: 5 diamonds, 5 clubs, 5 hearts, J spades. The player may elect to keep the 5 diamonds, 5 clubs, and 5 hearts, and discard and replace the J spades. A replacement card 126, shown in FIG. 2*b* as 5 spades, is then dealt to the player to create the final player hand 114. The set of cribbage rules is then used to evaluate the hand as follows:

| | |
|---|---|
| 5 diamonds + 5 clubs + 5 hearts | 2 Points (Rule 1) |
| 5 diamonds + 5 clubs + 5 spades | 2 Points (Rule 1) |
| 5 diamonds + 5 hearts + 5 spades | 2 Points (Rule 1) |
| 5 clubs + 5 hearts + 5 spades | 2 Points (Rule 1) |
| 5 diamonds + 5 clubs | 2 Points (Rule 2) |
| 5 diamonds + 5 hearts | 2 Points (Rule 2) |
| 5 diamonds + 5 spades | 2 Points (Rule 2) |
| 5 clubs + 5 hearts | 2 Points (Rule 2) |
| 5 clubs + 5 spades | 2 Points (Rule 2) |
| 5 hearts + 5 spades | 2 Points (Rule 2) |
| Total | 20 Points |

Thus, the final player hand 114 yields a player score 116 (shown on FIG. 2*b*) of 20 points. When compared to a paytable 122, it can be seen that the player score 116 exceeds a predetermined total 120, and thus a payout 118 will be awarded. From the paytable 122, it appears that a payout 118 of 10:1 is awarded for a score 124 of 20. Thus the player will receive 10×1 credit, or 10 credits, for the final player hand 114.

Figure 3:
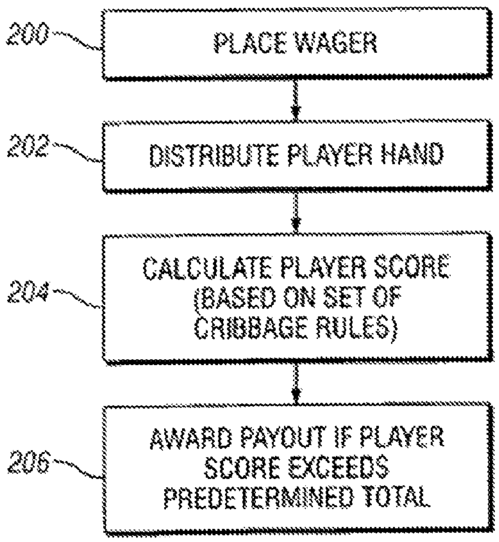
FIG. 3 is a flowchart presenting a method of playing a game according to the present invention.

Turning now to FIG. 3, the present invention further includes a method of playing a game according to the present invention. First, a wager is placed by a player in box 200. A final player hand is then distributed to the player in box 202. The final player hand includes at least four symbols. Next, a player score is calculated for the final player hand according to a set of cribbage rules in box 204. Finally, a payout is awarded based on the wager if the player score exceeds a predetermined total in box 206. The payout preferably increases as the player score increases according to the odds of achieving a given player score as described with respect to the game according to the present invention above.

Figure 4:
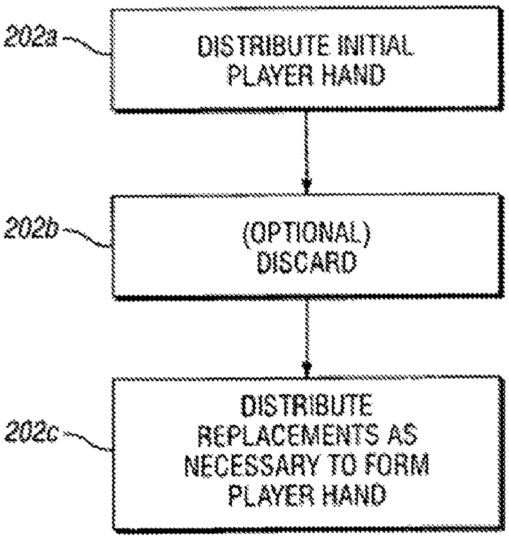
FIG. 4 is a flowchart presenting an alternative method of distributing a player hand which may be used in conjunction with the method presented in FIG. 3; and, FIG. 5 is a block diagram of a gaming machine for providing a keno-like game having a poker pay-table, according to an embodiment of the present invention.

The final player hand may be distributed using a discard option, in which case distribution of the final player hand occurs as shown in FIG. 4. First, in box 202*a*, an initial player hand is distributed to the player, with the initial player hand including at least four symbols. Next, in box 202*b*, the player is allowed to discard one or more symbols from the initial player hand. It should be noted that the player need not discard any of the symbols from the initial player hand, in which case the initial player hand would be identical to the final player hand. However, should the player choose to discard one or more symbols from the initial player hand, replacement symbols are distributed as necessary to create the final player hand in box 202*c*. The method according to the present invention can be played using a video display or a tangible display. Preferably, the symbols are playing cards.

While different embodiments for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

What is claimed is:

1. A gaming machine for providing a game to a player, comprising:

a user interface allowing the player to place a wager;

a video display;

a controller coupled to the user interface and the display for providing a virtual deck of playing cards and allowing the player to place a wager using the user interface, each of the playing cards having a rank and a suit, for randomly establishing an initial player hand consisting of a predetermined number of the playing cards, displaying the initial player hand on the video display, allowing the player to discard zero or more of the playing cards in the initial player hand using the user interface, and replacing any discarded card in the initial player hand with a randomly chosen playing card from the deck of playing cards, forming a final player hand consisting of the same number of playing cards as the initial player hand, and for displaying the final hand on the video display, establishing a player score only as a function of the final player hand using a set of cribbage type counting rules, displaying the player score on the video display, and responsively awarding the player an award as a function of the player score and a predetermined pay table.

2. A gaming machine, as set forth in claim 1, wherein the controller awards the player the award if the player score exceeds a predetermined total.

3. A gaming machine, a set forth in claim 1, wherein each rank has an associated number value and the counting rules establishes a first player point value for each combination of playing cards in the final player hand whose rank adds to 15.

4. A gaming machine, as set forth in claim 3, wherein the counting rules establish a second player point value for each set of 3 playing cards in the final player hand which have the same suit.

5. A gaming machine, as set forth in claim 4, wherein the counting rules establish a third player point value for a set of 4 playing cards in the final player hand which have the same suit.

6. A gaming machine, as set forth in claim 1, wherein the initial and the final player hand consist of 4 playing cards.

7. A gaming machine, as set forth in claim 6, wherein the player may discard up to 4 playing cards in the initial player hand.

8. A gaming machine, as set forth in claim 1, wherein the cribbage type counting rules includes at least the following rules:

a) awarding two points for each combination of playing cards in the final player hand having ranks which sum to 15, b) awarding two points for each pair of playing cards in the final player hand having the same rank, c) awarding one point for each playing card in a rank sequence of three or more playing cards in the final player hand, and, d) awarding three points for three playing cards in the final player hand having the same suit.

9. A gaming machine, as set forth in claim 8, wherein the cribbage type counting rules further includes the rule of awarding four points for 4 playing cards in the final player hand having the same suit.

10. A gaming machine, as set forth in claim 9, wherein the cribbage type counting rules further includes the rule of awarding 1 point for a predetermined playing card in the final hand having a predetermined rank and suit.

11. A gaming machine, as set forth in claim 10, wherein the predetermined rank and suit is the Jack of Clubs.

12. A gaming machine, as set forth in claim 1, wherein the pay table includes the following payouts:

| Score | Payout |
|---|---|
| 16 | 1:1 |
| 17 | 2:1 |
| 18 | 3:1 |
| 19 | 5:1 |
| 20 | 10:1 |
| 21 | 20:1 |
| 22 | 50:1 |
| 23 | 100:1 |
| 24 | 500:1 |
| 25 | 1000:1. |

13. A gaming machine for providing a video poker card game to a player, comprising:

a user interface for allowing the player to place a wager;

a video display;

a controller coupled to the user interface and the display for providing a virtual deck of playing cards and allowing the player to place a wager using the user interface, each of the playing cards having a rank and a suit, for randomly establishing an initial player hand consisting of a predetermined number of the playing cards, displaying the initial player hand on the video display, a allowing the player to discard zero or more of the playing cards in the initial player hand using the user interface, replacing any discarded card in the initial player hand with a randomly chosen playing card from the deck of playing cards, forming a final player hand consisting of the same number of playing cards as the initial player hand, and displaying the final player hand on the video display, and for establishing a player score only as a function of the final player hand using a set of cribbage type counting rules, displaying the player score on the video display, comparing the player score with a predetermined total, and responsively awarding the player an award as a function of the player score, the predetermined total, and a predetermined pay table if the player score exceeds the predetermined total.

14. A gaming machine, as set forth in claim 13, wherein the cribbage type counting rules includes at least the following rules:

a) awarding two points for each combination of playing cards in the final player hand having ranks which sum to 15, b) awarding two points for each pair of playing cards in the final player hand having the same rank, c) awarding one point for each playing card in a rank sequence of three or more playing cards in the final player hand, and, d) awarding three points for three playing cards in the final player hand having the same suit.

15. A gaming machine, as set forth in claim 14, wherein the cribbage type counting rules further includes the rule of awarding four points for 4 playing cards in the final player hand having the same suit.

16. A gaming machine, as set forth in claim 15, wherein the cribbage type counting rules further includes the rule of awarding 1 point for a predetermined playing card in the final hand having a predetermined rank and suit.

17. A gaming machine, as set forth in claim 16, wherein the predetermined rank and suit is the Jack of Clubs.

18. A gaming machine, as set forth in claim 15, wherein the pay table includes the following payouts:

| Score | Payout |
|---|---|
| 16 | 1:1 |
| 17 | 2:1 |
| 18 | 3:1 |
| 19 | 5:1 |
| 20 | 10:1 |
| 21 | 20:1 |
| 22 | 50:1 |
| 23 | 100:1 |
| 24 | 500:1 |
| 25 | 1000:1. |

* * * * *